(No Model.)
2 Sheets—Sheet 1.
S. WILSON.
MECHANICALLY PROPELLED FIGURE.
No. 526,984.
Patented Oct. 2, 1894.
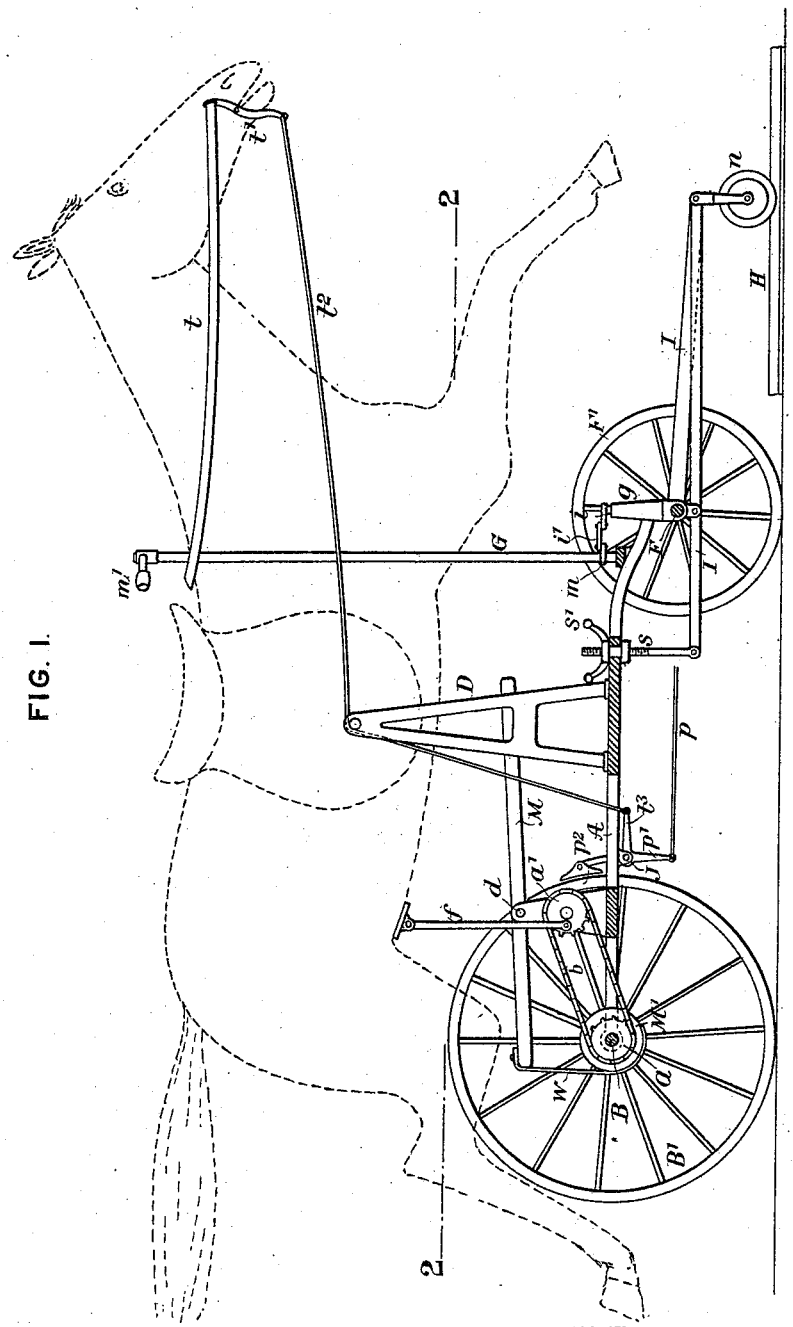
FIG. I.
WITNESSES.
R. Schleicher
G. F. Turner
INVENTOR.
Stephen Wilson.
By his Attorneys.
Howson & Howson

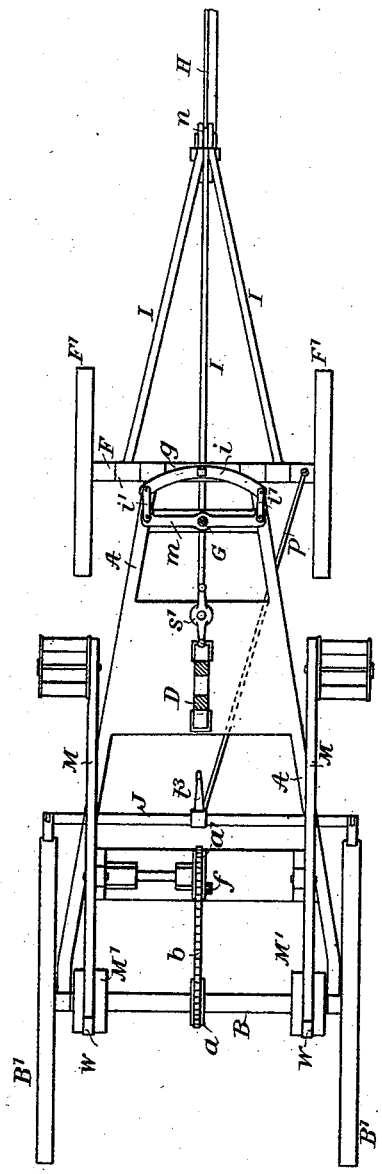

UNITED STATES PATENT OFFICE.

STEPHEN WILSON, OF PHILADELPHIA, PENNSYLVANIA, ASSIGNOR TO THE MECHANICAL AMUSEMENT COMPANY, OF WOODBURY, NEW JERSEY.

MECHANICALLY-PROPELLED FIGURE.

SPECIFICATION forming part of Letters Patent No. 526,984, dated October 2, 1894.

Application filed November 16, 1893. Serial No. 491,087. (No model.)

*To all whom it may concern:*

Be it known that I, STEPHEN WILSON, a citizen of the United States, residing in Philadelphia, Pennsylvania, have invented certain Improvements in Mechanically-Propelled Figures, of which the following is a specification.

My invention relates to that class of mechanical figures or objects mounted upon wheels and intended to be propelled by the rider, one object of my invention being to provide means whereby motion is imparted to the figure upon which the rider is seated, such motion being independent of the forward motion and intended to simulate the natural movement of the figure when in action.

Further objects are to provide for the steering of the figure either positively or under control of the rider and for an automatic application of the brakes in turning a curve, whereby, when a series of figures is running side by side the advantage of the shorter radius in turning is counteracted by a more or less forcible application of the brakes. These objects I attain in the manner hereinafter set forth reference being had to the accompanying drawings, in which—

Figure 1, is a view partly in side elevation and partly in section of a mechanical horse constructed in accordance with my invention, the outlines of the horse being shown by dotted lines; and Fig. 2, is a sectional plan view of the same, on the line 2—2.

A represents a horizontal frame having at the rear end bearings for the rear axle B which is free to turn in said bearings and carries the rear supporting wheels B' one at each end of the axle.

The figure of the horse is pivoted at about the center of its length and within the body upon a standard D which is suitably secured to a cross bar of the frame A and provides a pivotal axis for the figure in such relation to the saddle that when the figure rocks on its pivot the motion of the rider will be somewhat similar to that of the rider of a trotting or galloping horse.

The rocking motion is transmitted to the figure of the horse from a sprocket wheel $a$ on the rear axle B, chains $b$ being adapted to the sprocket wheel and to another wheel $a'$ carried by a short shaft $d$ which is adapted to suitable bearings mounted upon the horizontal frame A.

Projecting from the face of the wheel $a'$ is a crank pin which is connected by a link $f$ to the under side of the body of the figure in the rear of the pivot so that as the axle B turns, a rocking motion will be imparted to said figure.

The front axle F carrying the forward wheels F' has a steering head mounted so as to be free to turn in the forward end $g$ of the frame A and said steering head has at the upper end arms $i$ connected by links $i'$ to arms $m$ projecting from the lower end of a rock shaft G which is mounted in suitable bearings on the frame A and in the body of the horse and is provided at the upper end with steering handles $m'$ so that the rider can effect the steering of the horse by turning these handles in one direction or the other. In some cases, however, it may be advisable to govern the course by means of a guide rail H, suitably fixed upon the track or platform upon which the supporting wheels run and in order to provide for this I mount upon the forward axle F a frame I carrying at the front end a caster wheel $n$ grooved for adaptation to said guide rail, or it may be ribbed for engagement with a slotted rail or with a slot in the track, or platform, as desired.

The central bar of the frame I is continued rearward beyond the front axle F and carries at its rear end a pivoted bolt $s$ which passes through a thumb nut $s'$ vertically confined in an opening in a cross bar on the frame A but free to turn in said cross bar, so that by turning this thumb nut in one direction or the other the frame I can be caused to swing upon the axle F and the caster wheel $n$ can be depressed into engagement with the guide rail or can be lifted so as to be free from engagement therewith.

One end of the axle F is connected by a cord or chain $p$ to an arm $p'$ on a rock shaft J which is adapted to suitable bearings on the frame A and has, at its opposite ends, arms $p^2$ carrying brake shoes adapted to be applied to the rear wheels, so that when the front axle is straight across the track the brakes will be free from contact with said wheels, but as soon as the axle is turned so as to direct the wheels around the curved end of the track the brakes will be applied with greater or less force, depending upon the sharpness of the curve. Hence where a series of figures is traveling side by side, those following the shorter course on the inside of the track will not have an undue advantage over those following the longer outer course, the retardation due to the application of the brakes being commensurate with the shorter distance which is traveled by the inside figures. In order that the rider may also apply the brakes by hand in order to bring the figure to a stop when the race is concluded, a bridle $t$ is connected to a lever $t'$ and the latter is connected by a cord or chain $t^2$ to another arm $t^3$ on the rock shaft J so that by pulling upon the bridle the brakes can be applied and the figure brought to rest.

Motion is imparted to the rear axle by the rider through the medium of pedal levers M, suitably mounted upon the fixed frame at each side of the figure of the horse, the front ends of these levers carrying appropriate pedals and their rear ends being connected by straps $w$ to automatic clutches M' of well known form on the rear axle, these clutches engaging with the axle on the forward movement and being restored to operative position by means of suitable springs when pressure is removed from the levers, as in the ordinary forms of lever operated cycles.

Although I have shown my invention as intended for the operation of the figure of a horse, it will be evident that other figures or objects may take the place of the same without departing from the essential features of my invention.

Having thus described my invention, I claim and desire to secure by Letters Patent—

1. The combination of the fixed frame, the driving axle, and its wheels, the front steering axle and its wheels, a standard projecting upward from the fixed frame a figure pivoted to said standard, levers and clutches whereby forward movement can be imparted to the driving axle by the rider of said figure, and mechanism independent of said driving mechanism whereby rocking movement is imparted to the figure from said driving axle, substantially as specified.

2. The combination of the fixed frame, its driving wheels and steering wheels, a figure mounted upon the fixed frame, a directing wheel, a frame carrying the same and hung to the steering axle, and means for swinging said frame so as to move the directing wheel into and out of engagement with the guide therefor, substantially as specified.

3. The combination of the fixed frame, its driving and steering wheels, braking mechanism for said driving wheels, and a connection between said braking mechanism and the steering axle, whereby the brakes are automatically applied with more or less force in rounding a curve, substantially as specified.

In testimony whereof I have signed my name to this specification in the presence of two subscribing witnesses.

STEPHEN WILSON.

Witnesses:
FRANK E. BECHTOLD,
JOSEPH H. KLEIN.